United States Patent
Liu

(10) Patent No.: US 7,945,807 B2
(45) Date of Patent: May 17, 2011

(54) COMMUNICATION SYSTEM FOR A PLURALITY OF I/O CARDS BY USING THE GPIO AND A METHOD THEREOF

(75) Inventor: Guangming Liu, Hangzhou (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 472 days.

(21) Appl. No.: 12/081,044

(22) Filed: Apr. 10, 2008

(65) Prior Publication Data
US 2009/0077294 A1 Mar. 19, 2009

Related U.S. Application Data

(60) Provisional application No. 60/973,537, filed on Sep. 19, 2007.

(51) Int. Cl.
G06F 3/00 (2006.01)
(52) U.S. Cl. .................... 714/4; 714/3; 714/2; 710/38
(58) Field of Classification Search .............. 714/4, 3; 710/38
See application file for complete search history.

(56) References Cited

U.S. PATENT DOCUMENTS

| | | | |
|---|---|---|---|
| 2004/0148542 A1* | 7/2004 | McAfee et al. | 714/2 |
| 2004/0223451 A1* | 11/2004 | Homma et al. | 370/228 |
| 2004/0230783 A1* | 11/2004 | Brice et al. | 713/1 |
| 2005/0060394 A1* | 3/2005 | Frechette et al. | 709/223 |
| 2007/0046325 A1* | 3/2007 | Balasubramanian et al. | 326/38 |
| 2007/0079032 A1* | 4/2007 | Bissessur et al. | 710/71 |
| 2008/0126597 A1* | 5/2008 | Hirai | 710/19 |
| 2009/0089473 A1* | 4/2009 | He | 710/300 |

* cited by examiner

Primary Examiner — Scott T Baderman
Assistant Examiner — Chae Ko
(74) Attorney, Agent, or Firm — Rosenberg, Klein & Lee

(57) ABSTRACT

A communication system for a plurality of I/O cards by using the GPIO (General Purpose Input/Output) and a method thereof are disclosed for overcoming the problems of the prior art; wherein the prior art uses the I2C and UART communication channels causing a greater quantity of the connecting lines to connect, thus the bus resource of the chip is consumed, which raises its cost. The present invention uses at least one GPIO port to replace a failure line of the I2C communication channel, or a failure line of the UART communication channel. The present invention also uses one or a plurality of additional GPIO ports to be the backup GPIO ports. Therefore, the present invention has a lot of characteristics, including excellent back-up capability, low cost, the communication channels can be easily switched, the required quantity of the signal lines is reduced, and the reliability of the communication is increased.

10 Claims, 4 Drawing Sheets

US 7,945,807 B2

COMMUNICATION SYSTEM FOR A PLURALITY OF I/O CARDS BY USING THE GPIO AND A METHOD THEREOF

REFERENCE TO RELATED APPLICATION

This Application is based on Provisional Patent Application Ser. No. 60/973,537, filed 19 Sep. 2007, currently pending.

BACKGROUND OF THE INVENTION

1. Field of the Invention

The present invention relates to a communication system for a plurality of I/O cards and a method thereof. In particular, this invention relates to a communication system for a plurality of I/O cards by using the GPIO (General Purpose Input/Output) and a method thereof.

2. Description of the Related Art

When two I/O cards (input/output cards) performs a dual-ways communication in a computer system, two communication channels (such as the I2C or the UART ports) are required to ensure the reliability of the dual-ways communication between the two I/O cards. However, the bus resource of the I/O card is wasted. Furthermore, it is difficult to enhance the reliability of the communication channel due to the bus resource is limited.

Reference is made to FIGS. 1A and 1B. FIG. 1A shows a schematic diagram of the communication system for two I/O cards of the prior art. FIG. 1B shows a flow chart of the communication method for two I/O cards of the prior art. In FIG. 1A, the communication system includes a first I/O card 10, a second I/O card 12 and a middle board 14. The first I/O card 10 and the second I/O card 12 perform the signal communication via the middle board 14. Each of the first I/O card 10 and the second I/O card 12 has a first microprocessor unit 100 and a second microprocessor unit 120. Both the first microprocessor unit 100 and the second microprocessor unit 120 have a plurality of function pins. Some of the function pins are the communication channel pins and are used for communicating with external chip. Therefore, in order to enhance the reliability of the communication channels, two communication channels are designed. The first microprocessor unit 100 has a first communication channel 1000 and a second communication channel 1002, and the second microprocessor unit 120 has a third communication channel 1200 and a fourth communication channel 1202.

The first communication channel 1000 and the fourth communication channel 1202 are the inter-integrated circuit (I2C) communication interfaces. The second communication channel 1002 and the third communication channel 1200 are the UART communication interfaces. Alternatively, the first communication channel 1000 and the fourth communication channel 1202 can be the UART communication interfaces, and the second communication channel 1002 and the third communication channel 1200 can be the I2C communication interfaces.

Reference is made to FIGS. 1A and 1B. FIG. 1B shows the flow chart of the communication method for two I/O cards of the prior art. Firstly, the first I/O card 10 and the second I/O card 12 are initialized and linked together (S100). The first communication channel 1000 and the fourth communication channel 1202 are checked to determine whether the first communication channel 1000 and the fourth communication channel 1202 fail or not (S102). If the first communication channel 1000 and the fourth communication channel 1202 fail, the second communication channel 1002 and the third communication channel 1200 are turned on to perform the communication between the first I/O card 10 and the second I/O card 12 (S104). If the first communication channel 1000 and the fourth communication channel 1202 do not fail, the first communication channel 1000 and the fourth communication channel 1202 perform the communication between the first I/O card 10 and the second I/O card 12 (S106).

The two I/O cards are communicated by utilizing the protocol of the first communication channel 1000 and the fourth communication channel 1202 (I2C) and the protocol of the second communication channel 1002 and the third communication channel 1200 (UART). When any one of the signal lines of the first communication channel 1000 and the fourth communication channel 1202 is damaged so that the bus of the first communication channel 1000 and the fourth communication channel 1202 all fail, the second communication channel 1002 and the third communication channel 1200 can be used for replacing the first communication channel 1000 and the fourth communication channel 1202. These two paths, the first communication channel 1000 and the fourth communication channel 1202, and the second communication channel 1002 and the third communication channel 1200, are designed to enhance the reliability and the stability of the communication. However, the quantity of the signal lines of the bus is large so that the bus resource of the processor chip is consumed, and its cost is increased.

SUMMARY OF THE INVENTION

One particular aspect of the present invention is to provide a communication system for a plurality of I/O cards by using the GPIO and a method thereof to overcome the problems of the prior art, such as quantity of the signal lines of the bus is large and bus resource of the processor chip is consumed.

The communication system for a plurality of I/O cards by using the GPIO includes a first I/O card having at least one first GPIO port, and a second I/O card electrically connected with the first I/O card via a middle board. The first GPIO port includes at least one first backup GPIO port. The second I/O card has at least one second GPIO port and the second GPIO port includes at least one second backup GPIO port. When the first GPIO port fails, the first backup GPIO port replaces the first GPIO port and performs a communication with the second backup GPIO port.

The communication method for a plurality of I/O cards by using the GPIO includes the following steps. The first GPIO port of the first I/O card and the second GPIO port of the second I/O card are initialized. The first GPIO port and the second GPIO port are checked to determine whether the first GPIO port and the second GPIO port fail or not (S102). A first backup GPIO port of the first I/O card and a second backup GPIO port of the second I/O card are turned on to replace the first GPIO port and the second GPIO port that have failed. Finally, the first backup GPIO port and the second backup GPIO port are used for performing a communication between the first I/O card and the second I/O card.

Because the quantity of the I2C ports or the UART ports is limited, the quantity of the ports of the communication system cannot be increased. However, the quantity of the GPIO ports can be increased. Therefore, the present invention uses the GPIO ports to perform the communication between I/O cards. One or more than one GPIO ports are used as the backup GPIO ports to simulate the communication protocols or the user defined protocols to replace the I2C port or the UART port communication channels. Therefore, the present invention has a lot of characteristics, including backup communication channels are existed, its cost is low, the communication channels can be easily switched, the quantity of the signal lines is low, and the reliability of the communication is high.

For further understanding of the invention, reference is made to the following detailed description illustrating the embodiments and examples of the invention. The description is only for illustrating the invention and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1A:
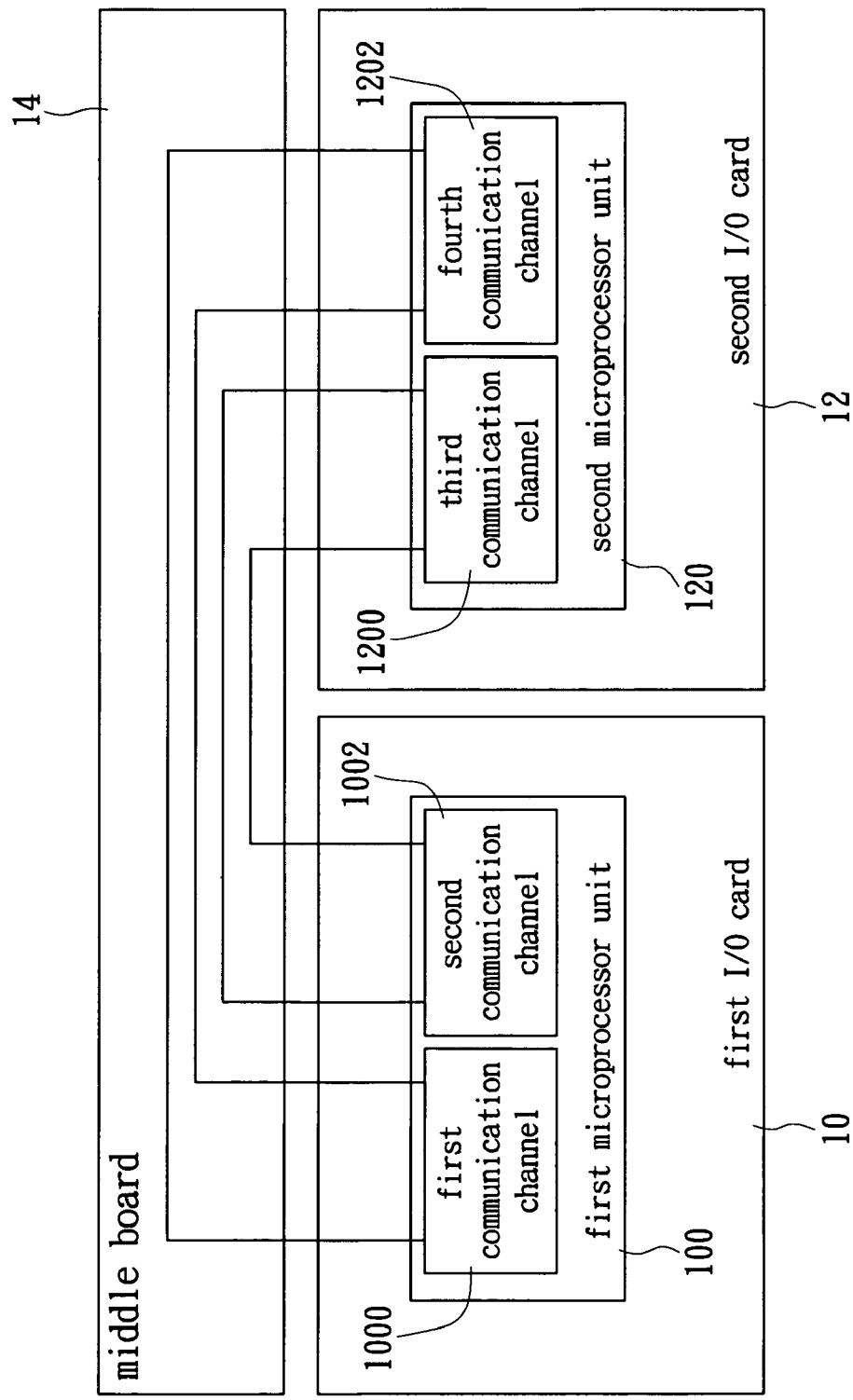
FIG. 1A is a schematic diagram of the communication system for two I/O cards of the prior art.
Figure 1B:
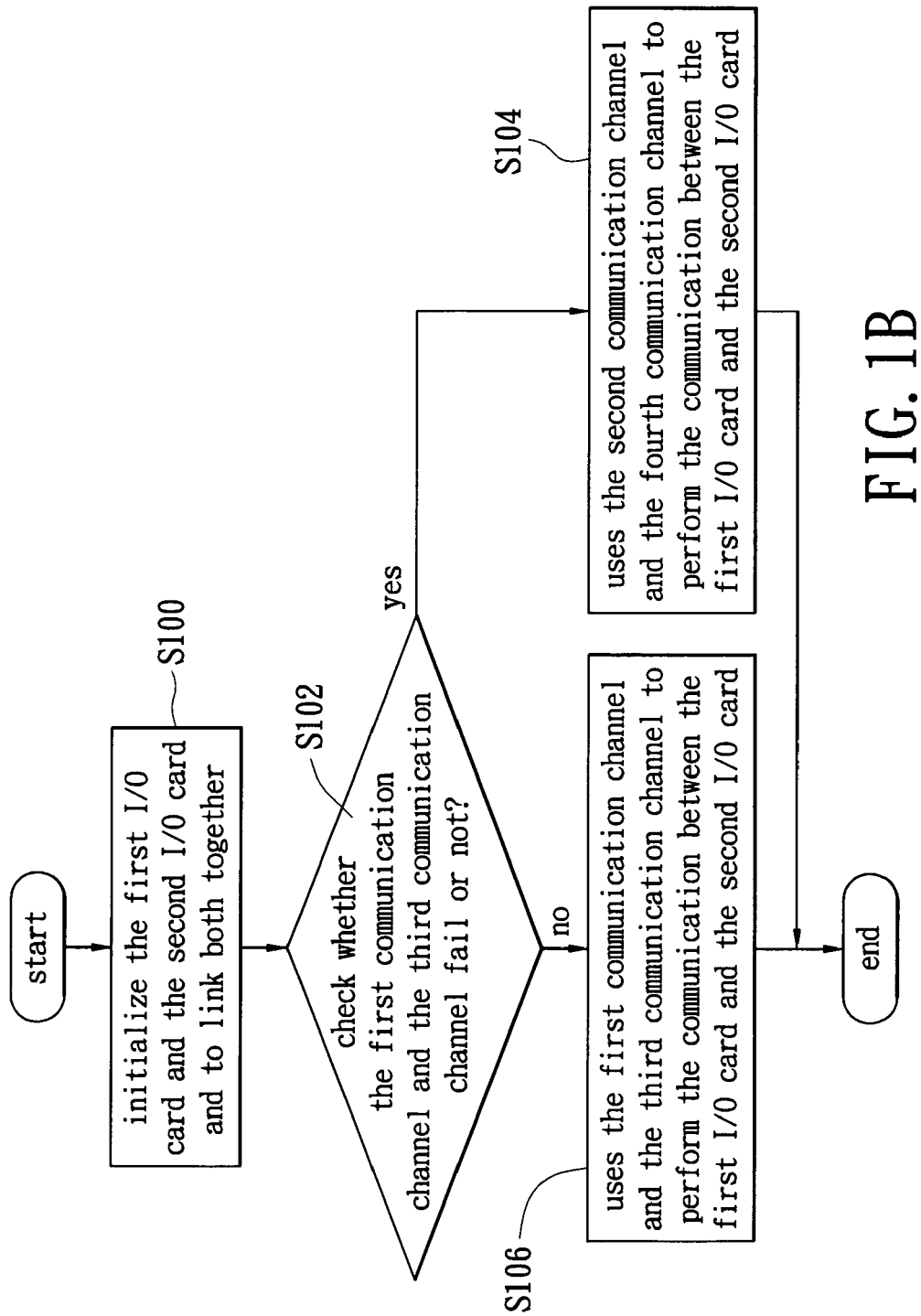
FIG. 1B is a flow chart of the communication method for two I/O cards of the prior art.
Figure 2A:
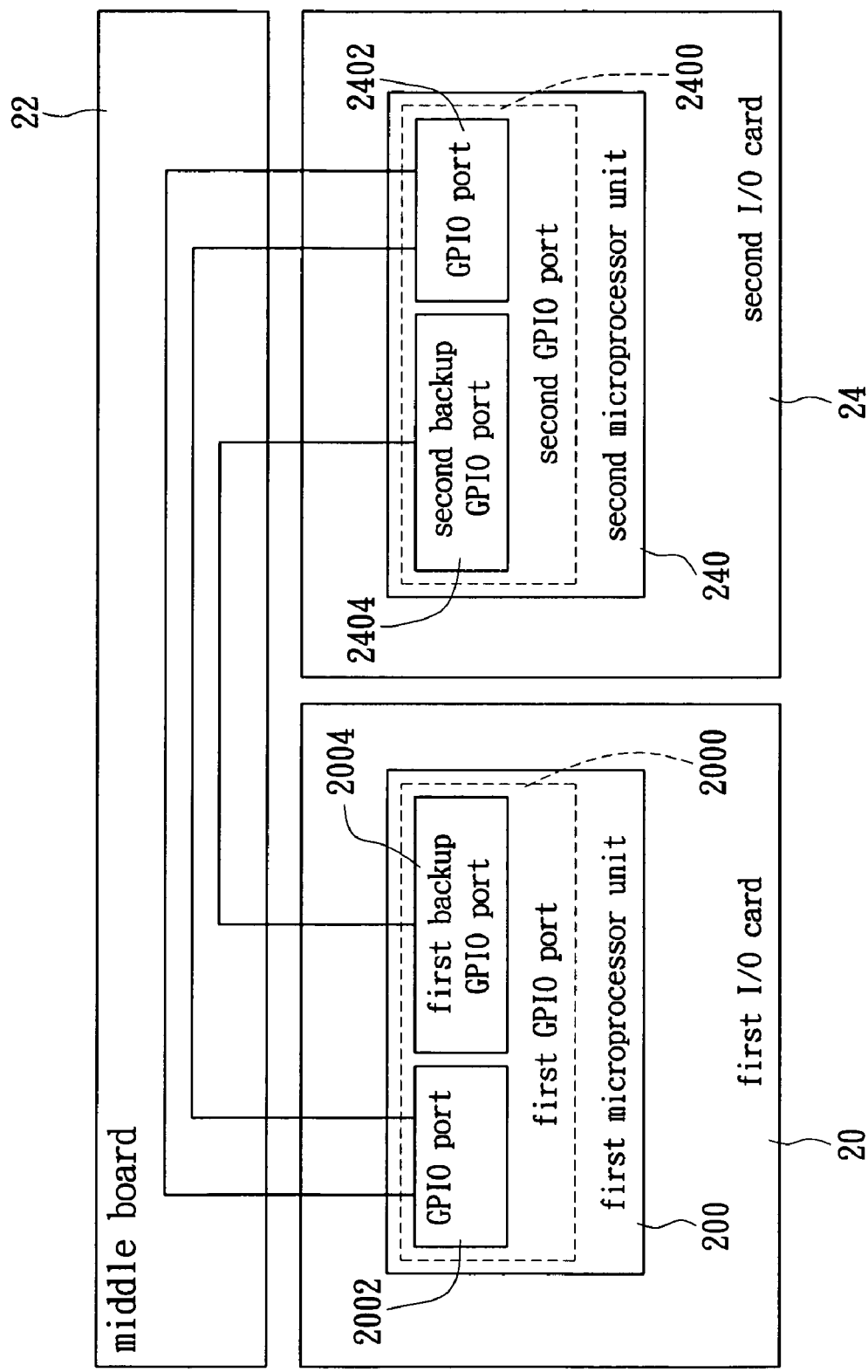
FIG. 2A is a schematic diagram of the communication system for a plurality of I/O cards by using the GPIO of the present invention.

Reference is made to FIG. 2A, which shows a schematic diagram of the communication system for a plurality of I/O cards by using the GPIO of the present invention. Two I/O cards are used as an example to illustrate the embodiment. However, the present invention is not limited to above, the communication system and the communication method of the present invention can be applied to a plurality of I/O cards.

The communication system for a plurality of I/O cards by using the GPIO includes a first I/O card 20, a middle board 22, and a second I/O card 24. Each of the first I/O card 20 and the second I/O card 24 respectively has a first microprocessor unit 200 and a second microprocessor unit 240. When the first microprocessor unit 200 and the second microprocessor unit 240 are designed, a lot of functional pins are designed according to the system requirements. Some of the functional pins are the communication channel pins and are used for communicating with an external chip.

The first microprocessor unit 200 of the first I/O card 20 has at least one first GPIO port 2000, and the first GPIO port 2000 includes at least one first backup GPIO port 2004 and at least one GPIO port 2002. The communication protocol for the GPIO port 2002 can be the I2C or UART communication protocol. In this embodiment, the I2C communication protocol is used as example. The present invention is not limited to above.

The middle board 22 is used for electrically connecting the first I/O card 20 with the second I/O card 24, and transmitting signals between the first I/O card 20 and the second I/O card 24. In addition to provide the above functions, the middle board 22 also includes the other electronic elements and chips.

The second I/O card 24 is electrically connected with the second I/O card 24 via the middle board 22. The second microprocessor unit 240 of the second I/O card 24 has at least one second GPIO port 2400, and the second GPIO port 2400 includes at least one second backup GPIO port 2404 and at least one GPIO port 2402. The communication protocol for the GPIO port 2402 is the same as the first GPIO port 2000, such as the I2C or UART communication protocol. In this embodiment, the I2C communication protocol is used as example. The I2C communication protocol defines two paths, including the serial data line (SDA) and the serial clock line (SCL). However, the present invention is not limited to above.

When the GPIO port 2002 of the first microprocessor unit 200 of the first I/O card 20 fails, such as the serial data line of the I2C fails so that the signals of the serial data line of the I2C cannot be exactly transmitted to the second I/O card 24, the first microprocessor unit 200 detects this condition and automatically uses the first backup GPIO port 2004 and the second backup GPIO port 2404 to implement the function of the serial data line and perform the communication between the first I/O card 20 and the second I/O card.

Similarly, when the serial clock line of the I2C fails so that the signals of the serial clock line of the I2C cannot be exactly transmitted to the second I/O card 24, the first microprocessor unit 200 detects this condition and automatically uses the first backup GPIO port 2004 and the second backup GPIO port 2404 to implement the function of the serial clock line and perform the communication between the first I/O card 20 and the second I/O card.

Figure 2B:
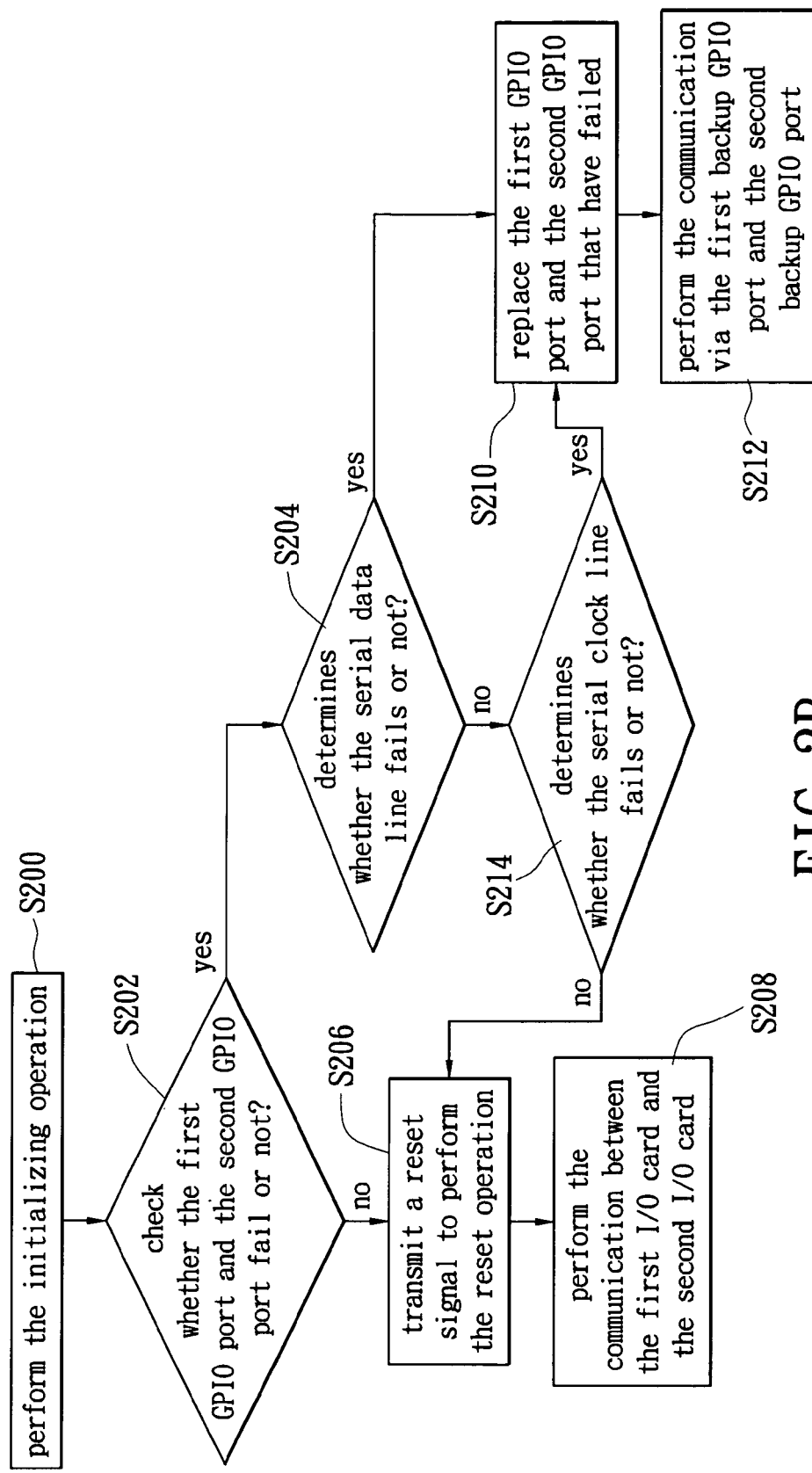
FIG. 2B is a flow chart of the communication method for a plurality of I/O cards by using the GPIO of the present invention.

Reference is made to FIGS. 2A and 2B. FIG. 2B shows a flow chart of the communication system for a plurality of I/O cards by using the GPIO of the present invention. Firstly, the first GPIO port 2000 of the first I/O card 20 and the second GPIO port 2400 of the second I/O card 24 are initialized (S200). The initializing process is to initialize the functions of the pins defined at the first microprocessor unit 200 and the second microprocessor unit 240 are designed. Next, the first microprocessor unit 200 and the second microprocessor unit 240 respectively detect the first GPIO port 2000 and the second GPIO port 2400 to check whether the first GPIO port 2000 of the first I/O card 20 and the second GPIO port 2400 fail or not (S202). In this embodiment, the I2C is used as an example, and the present invention uses the signal transmitted back by the second GPIO port of the second microprocessor unit 240 to determine whether the first GPIO port 2000 of the first I/O card 20 and the second GPIO port 2400 fail or not.

When the result of the step S202 is yes, whether the serial data line fails or not is determined (S204). When the result of the step S202 is no, the first microprocessor unit 200 transmits a reset signal to reset the second microprocessor unit 240 (S2060), and performs the communication between the first I/O card 20 and the second I/O card 24 via the GPIO port 2002 of the first I/O card 20 and the GPIO port 2402 of the second I/O card 24 (S208).

In this embodiment, the first microprocessor unit 200 is the primary terminal, and the second microprocessor unit 240 is the secondary terminal. Therefore, in step S204, the first microprocessor unit 200 is used as a signal transmission terminal. After the first microprocessor unit 200 transmits the signal, the serial data line is determined to be failed if the first microprocessor unit 200 cannot receive the signal transmitted back from the second microprocessor unit 240. The signal line may be damaged, the serial data line of the GPIO port 2402 of the second microprocessor unit 240 is broken, or the voltage of the second microprocessor unit 240 is low so that the second microprocessor unit 240 cannot transmit a response signal. Under this condition, the first backup GPIO port 2004 of the first I/O card 20 and the second backup GPIO port 2404 of the second I/O card 24 are used for respectively replacing the serial data line of the GPIO port 2002 of the first GPIO port 2000 and the serial data line of the GPIO port 2402 of the second GPIO port 2400 that have failed (S210). At this time, both the first backup GPIO port 2004 and the second backup GPIO port 2404 are used as the serial data line.

Next, the first backup GPIO port 2004 and the second backup GPIO port 2404 are used for performing the communication between the first I/O card 20 and the second I/O card 24 (S212). When the result of the step S204 is no, whether the serial clock line fails or not is determined (S214). In step S214, when the serial clock line fails, the first backup GPIO port 2004 of the first I/O card 20 and the second backup GPIO port 2404 of the second I/O card 24 are used for respectively replacing the serial clock line of the GPIO port 2002 of the first GPIO port 2000 and the serial clock line of the GPIO port 2402 of the second GPIO port 2400 that have failed (S210). At this time, both the first backup GPIO port 2004 and the second backup GPIO port 2404 are used as the serial clock line. Next, the first backup GPIO port 2004 and the second backup GPIO port 2404 are used for performing the communication between the first I/O card 20 and the second I/O card 24 (S212).

When the result of the step S214 is no, the first microprocessor unit 200 transmits a reset signal to reset the second microprocessor unit 240 (S206), and uses the GPIO port 2002 of the first I/O card 20 and the GPIO port 2402 of the second I/O card 24 to perform the communication between the first I/O card 20 and the second I/O card 24 (S208).

When the GPIO ports are used to replace the I2C protocol to implement the communication between two I/O cards, and the serial data line of the I2C fails so that the signal of the serial data line of the I2C cannot be exactly transmitted to another I/O card, the first microprocessor unit 200 used as the command terminal of the I2C will detect this situation. When the situation occurs, the first microprocessor unit 200 automatically uses the first backup GPIO port 2004 to replace the serial data line, and informs the second microprocessor unit 240 used as the receiving terminal of the I2C to use the second backup GPIO port 2404 as the serial data line. Next, the command terminal uses the first backup GPIO port 2004 to transmit the signal to the second backup GPIO'port 2404. Thereby, the function of the serial data line is implemented.

Similarly, when the serial clock line of the I2C fails so that the signal of the serial clock line of the I2C cannot be exactly transmitted to another I/O card, the first microprocessor unit 200 used as the command terminal of the I2C will detect this situation. When the situation occurs, the first microprocessor unit 200 automatically uses the first backup GPIO port 2004 to replace the serial clock line, and informs the second microprocessor unit 240 used as the receiving terminal of the I2C to use the second backup GPIO port 2404 as the serial clock line. Next, the command terminal uses the first backup GPIO port 2004 to transmit the signal to the second backup GPIO port 2404. Thereby, the function of the serial clock line is implemented. The backup function is implemented.

The present invention merely needs to use the simple GPIO port to implement the communication between a plurality of I/O cards. According the communication protocol and the required backup, the quantity of the GPIO ports are determined. For example, when a single GPIO port are sued for implementing the protocol, another backup GPIO port is used to implementing the backup function, or another n backup GPIO ports are used to implementing the backup function to enhance the reliability. n is an integer. In a dual GPIO ports or a plurality of GPIO ports communication system, a single backup GPIO port or a plurality of backup GPIO port can be used. When one of GPIO port fails, the back GPIO port will automatically replace the GPIO port that has failed to perform the communication.

The present invention using a plurality of independent GPIO ports has two merits. The first merit is that quantity of the signal lines is less than one of the prior art using the I2C or UART. The second merit is that the GPIO ports can be used as the backup lines to enhance the communication reliability between a plurality of I/O cards. When one or more than one signal lines fail, the backup lines replace the failed signal lines.

The present invention uses the GPIO ports to implement the communication between a plurality of I/O cards that is different from the prior art using the I2C or UART communication channels. The present invention simulates the existed protocol (such as I2C or UART) or the user's defined protocol on the GPIO ports, and uses one or a plurality of GPIO ports to be the backup GPIO ports to enhance the backup of the bus. Therefore, the present invention has a lot of characteristics, including backup communication channels are existed, its cost is low, the communication channels can be easily switched, the quantity of the signal lines is low, and the reliability of the communication is high.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A communication method for a plurality of I/O cards by using General Purpose Input/Output (GPIO), comprising:
    initializing a first GPIO port of a first I/O card and a second GPIO port of a second I/O card;
    checking whether the first GPIO port and the second GPIO port fail or not;
    using a first backup GPIO port of the first I/O card and a second backup GPIO port of the second I/O card to respectively replace a GPIO port of the first GPIO port and a GPIO port of the second GPIO port that have failed, when the first GPIO port and the second GPIO port fail; and
    performing communication between the first I/O card and the second I/O card via the first backup GPIO port and the second backup GPIO port.

2. The communication method for a plurality of I/O cards by using the GPIO as claimed in claim 1, wherein the step of checking whether the first GPIO port and the second GPIO port fail or not depends on a signal that is transmitted back from the second GPIO port.

3. The communication method for a plurality of I/O cards by using the GPIO as claimed in claim 1, wherein the step of checking whether the first GPIO port and the second GPIO port fail or not further includes a step of determining whether a serial data line fails or not if the result of step of checking whether the first GPIO port and the second GPIO port fail or not is yes, and a step of transmitting a reset signal from a first microprocessor unit of the first I/O card to reset a second microprocessor unit of the second I/O card if the result of checking whether the first GPIO port and the second GPIO port fail or not is no.

4. The communication method for a plurality of I/O cards by using the GPIO as claimed in claim 3, wherein the step of transmitting a reset signal from a first microprocessor unit of the first I/O card to reset a second microprocessor unit of the second I/O card further includes a step of performing a communication between the first I/O card and the second I/O card via the GPIO port of first I/O card and the GPIO port of the second I/O card.

5. The communication method for a plurality of I/O cards by using the GPIO as claimed in claim 3, further comprising a step of using a first backup GPIO port of the first I/O card and a second backup GPIO port of the second I/O card to respectively replace the GPIO port of first I/O card and the GPIO port of the second I/O card when the serial data line fails, and a step of determining whether the serial clock line fails or not when the serial data line does not fail.

6. The communication method for a plurality of I/O cards by using the GPIO as claimed in claim 5, further comprising a step of using a first backup GPIO port of the first I/O card and a second backup GPIO port of the second I/O card to respectively replace the GPIO port of first I/O card and the GPIO port of the second I/O card when the serial clock line fails, and a step of transmitting a reset signal from a first microprocessor unit of the first I/O card to reset a second microprocessor unit of the second I/O card when the serial clock line does not fail.

7. A communication system for a plurality of I/O cards by using General Purpose Input/Output (GPIO), comprising:
   a first I/O card, wherein the first I/O card has at least one first GPIO port, and the first GPIO port includes at least one first backup GPIO port; and
   a second I/O card electrically connected with the first I/O card, wherein the second I/O card has at least one second GPIO port and the second GPIO port includes at least one second backup GPIO port;
   wherein the first backup GPIO port replaces the first GPIO port that has failed and performs a communication with the second backup GPIO port when the first GPIO port fails.

8. The communication system for a plurality of I/O cards by using the GPIO as claimed in claim 7, wherein the first backup GPIO port is used as a serial data line or a serial clock line.

9. The communication system for a plurality of I/O cards by using the GPIO as claimed in claim 7, wherein the second backup GPIO port is used as a serial data line or a serial clock line.

10. The communication system for a plurality of I/O cards by using the GPIO as claimed in claim 7, further comprising a middle board, wherein the middle board is used for connecting the first I/O card with the second I/O card for transmitting a signal between the first I/O card and the second I/O card.

* * * * *